(12) United States Patent
Engrav et al.

(10) Patent No.: US 11,061,525 B2
(45) Date of Patent: Jul. 13, 2021

(54) DIGITAL MAP CALENDAR USER INTERFACE

(71) Applicant: Microsoft Technology Licensing, LLC, Redmond, WA (US)

(72) Inventors: Peter L. Engrav, Seattle, WA (US); Aaron E. Erlandson, Kirkland, WA (US); Stephen White, Kirkland, WA (US); Trevor J. Harris, Seattle, WA (US); Malia M. Douglas, Seattle, WA (US); Rachel Sirkin, Seattle, WA (US); Shikha Devesh Desai, Bellevue, WA (US); Jie Dong, Woodinville, WA (US); Evan W. Lavender, Redmond, WA (US); Christian Harper-Cyr, Seattle, WA (US); Yoon Jin Lee, Woodinville, WA (US); Caitlin E. Ashley-Rollman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/414,317

(22) Filed: May 16, 2019

(65) Prior Publication Data
US 2020/0363910 A1    Nov. 19, 2020

(51) Int. Cl.
*G06F 3/0485* (2013.01)
*G06F 3/0481* (2013.01)
(Continued)

(52) U.S. Cl.
CPC .......... *G06F 3/0481* (2013.01); *G06F 3/0485* (2013.01); *G06F 16/252* (2019.01); *G06F 16/26* (2019.01); *G06F 2203/04806* (2013.01)

(58) Field of Classification Search
CPC ........ G06F 16/447; G06F 16/50; G06F 16/51; G06F 16/5866; G06F 16/54; G06F 16/58; G06F 16/9577
See application file for complete search history.

(56) References Cited

U.S. PATENT DOCUMENTS 5,845,257 A    12/1998  Fu et al.
6,978,271 B1   12/2005  Hoffman et al.
(Continued)

FOREIGN PATENT DOCUMENTS

CN    101145223 A    3/2008
CN    101520862 A    9/2009
CN    105279637 A    1/2016

OTHER PUBLICATIONS

"Notice of Allowance Issued in U.S. Appl. No. 14/220,386", dated May 6, 2016, 18 Pages.
(Continued)

*Primary Examiner* — Di Xiao
(74) *Attorney, Agent, or Firm* — International IP Law Group, PLLC

(57) ABSTRACT

A system for a map calendar is described herein. The map calendar includes a calendar content database that is to store at least one item of calendar content and a navigation system that determines a zoom level and a panning position of the map calendar. The map calendar also includes a processor that is to determine a summarization level based on the zoom level and the panning position of the map calendar and render the calendar content according to the summarization level.

20 Claims, 12 Drawing Sheets

(51) Int. Cl.
*G06F 16/26* (2019.01)
*G06F 16/25* (2019.01)

(56) References Cited

U.S. PATENT DOCUMENTS

| | | | |
|---|---|---|---|
| 7,305,491 B2 | 12/2007 | Miller et al. | |
| 7,689,448 B2 | 3/2010 | Fu et al. | |
| 8,295,126 B2 | 10/2012 | Wood et al. | |
| 8,538,992 B1 | 9/2013 | Lawyer et al. | |
| 8,607,250 B2 | 12/2013 | Oral et al. | |
| 9,438,649 B2 | 9/2016 | Tallett | |
| 2003/0088427 A1 | 5/2003 | Elsey et al. | |
| 2006/0136121 A1 | 6/2006 | Eisen | |
| 2007/0150502 A1 | 6/2007 | Bloebaum et al. | |
| 2007/0186193 A1 | 8/2007 | Curran | |
| 2008/0022201 A1* | 1/2008 | Chen | G06Q 10/109 715/700 |
| 2009/0040875 A1 | 2/2009 | Buzescu et al. | |
| 2009/0112986 A1 | 4/2009 | Caceres | |
| 2009/0168609 A1 | 7/2009 | Weir et al. | |
| 2010/0075648 A1 | 3/2010 | Matsuoka et al. | |
| 2010/0162105 A1 | 6/2010 | Beebe et al. | |
| 2010/0175001 A1 | 7/2010 | Lazarus et al. | |
| 2010/0330974 A1 | 12/2010 | Balannik et al. | |
| 2011/0252351 A1 | 10/2011 | Sikora et al. | |
| 2011/0305437 A1* | 12/2011 | Sakaguchi | H04N 1/00424 386/278 |
| 2012/0084286 A1 | 4/2012 | Hubner et al. | |
| 2012/0197900 A1 | 8/2012 | Mandre | |
| 2012/0233563 A1 | 9/2012 | Chakra et al. | |
| 2014/0047312 A1 | 2/2014 | Ruble et al. | |
| 2014/0074536 A1 | 3/2014 | Meushar et al. | |
| 2014/0136263 A1 | 5/2014 | Lee et al. | |
| 2014/0156597 A1 | 6/2014 | Hakami et al. | |
| 2014/0365951 A1 | 12/2014 | Fernandes et al. | |
| 2015/0156026 A1 | 6/2015 | Gault et al. | |
| 2015/0178690 A1* | 6/2015 | May | G06Q 10/1095 705/7.19 |
| 2015/0199077 A1 | 7/2015 | Zuger et al. | |
| 2015/0268839 A1 | 9/2015 | Tallett | |
| 2015/0294273 A1 | 10/2015 | Barraci et al. | |
| 2015/0347982 A1 | 12/2015 | Jon et al. | |
| 2015/0378619 A1 | 12/2015 | Maeda et al. | |
| 2015/0379476 A1* | 12/2015 | Chaudhri | G06F 3/0482 705/7.18 |
| 2016/0104119 A1 | 4/2016 | Von hessberg et al. | |
| 2016/0189111 A1 | 6/2016 | Bookallil et al. | |
| 2016/0203444 A1 | 7/2016 | Frank et al. | |
| 2016/0275458 A1 | 9/2016 | Meushar et al. | |
| 2016/0364698 A1 | 12/2016 | Bouz et al. | |
| 2016/0370985 A1 | 12/2016 | Tallett | |
| 2018/0077542 A1 | 3/2018 | Xie et al. | |
| 2018/0089632 A1 | 3/2018 | Singh et al. | |
| 2018/0095938 A1 | 4/2018 | Monte | |
| 2018/0114198 A1 | 4/2018 | Ghotbi et al. | |
| 2018/0189744 A1 | 7/2018 | Frank et al. | |
| 2018/0336532 A1 | 11/2018 | Hillery | |
| 2019/0121994 A1 | 4/2019 | Embiricos et al. | |
| 2020/0364199 A1 | 11/2020 | Engrav et al. | |
| 2020/0364673 A1 | 11/2020 | Engrav et al. | |

OTHER PUBLICATIONS

"Final Office Action Issued in U.S. Appl. No. 15/256,666", dated Apr. 23, 2019, 14 Pages.

"Non Final Office Action Issued in U.S. Appl. No. 15/256,666", dated Nov. 16, 2018, 11 Pages.

Hinnant, Howard, "Chrono-Compatible Low-Level Date Algorithms", Retrieved From: https://howardhinnant.github.io/date_algorithms.html, Sep. 7, 2013, 24 Pages.

Masoodian, et al., "A Comparison of Linear and Calendar Travel Itinerary Visualizations for Personal Digital Assistants", In Proceedings of the OZCHI, the CHISIG Annual Conference on Human-Computer Interaction, Nov. 20, 2004, 10 Pages.

"Non Final Office Action Issued in U.S. Appl. No. 16/414,374", dated Sep. 8, 2020, 12 Pages.

"International Search Report and Written Opinion Issued in PCT Application No. PCT/US20/028027", dated Jul. 20, 2020, 11 Pages.

"International Search Report and Written Opinion Issued in PCT Application No. PCT/US20/028029", dated Jul. 23, 2020, 11 Pages.

"Non Final Office Action Issued in U.S. Appl. No. 16/414,367", dated Jan. 13, 2021, 17 Pages.

"International Search Report and Written Opinion Issued in PCT Application No. PCT/US20/028030", dated Jun. 2, 2020, 11 Pages.

"Notice of Allowance Issued in U.S. Appl. No. 16/414,367", dated Mar. 12, 2021, 16 Pages.

* cited by examiner

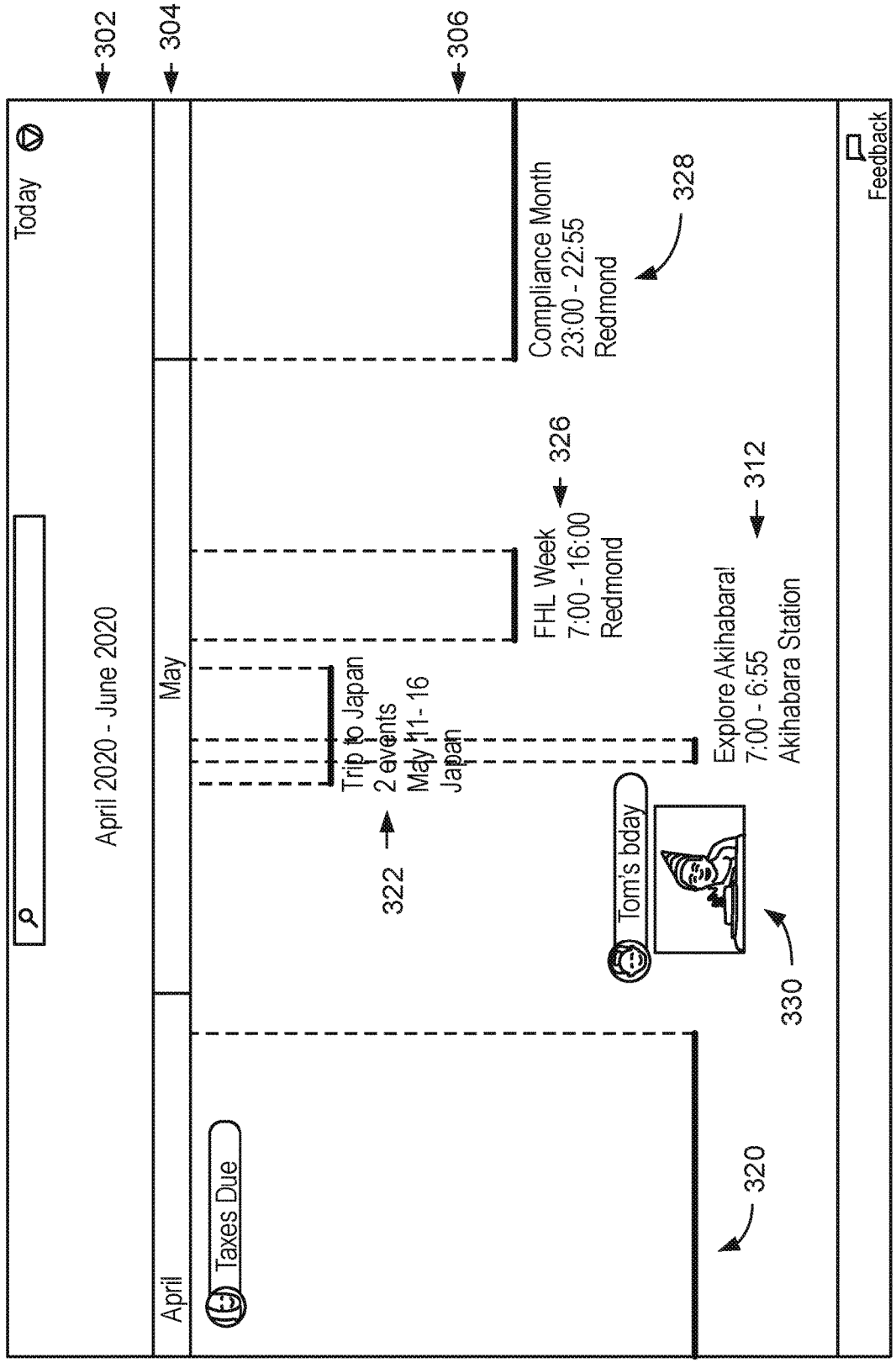

US 11,061,525 B2

DIGITAL MAP CALENDAR USER INTERFACE

BACKGROUND

The present disclosure relates to graphical user interfaces. In particular, the present disclosure relates to a user interface that enables a digital map representation of a calendar.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a system for a map calendar is described. The map calendar includes a calendar content database that is to store at least one item of calendar content and a navigation system that determines a zoom level and a panning position of the map calendar. The map calendar also includes a processor that is to determine a summarization level based on the zoom level and the panning position of the map calendar and render the calendar content according to the summarization level.

In another embodiment described herein, a method for a digital map calendar user interface is described. The method comprises storing at least one item of calendar content and determining a zoom level and a panning position of the map calendar. The method also comprises determining a summarization level based on the zoom level and the panning position of the map calendar and rendering the calendar content according to the summarization level.

Another embodiment described herein includes an electronic device. The electronic device includes a calendar content database that is to store at least one item of calendar content and a navigation system that determines a zoom level and a panning position of the map calendar. The electronic device also includes a processor that is to determine a summarization level based on the zoom level and the panning position of the map calendar and render the calendar content according to the summarization level.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIG. 3B is a block diagram of the map calendar with a multiple month-based time organization;

DETAILED DESCRIPTION

Figure 1A:
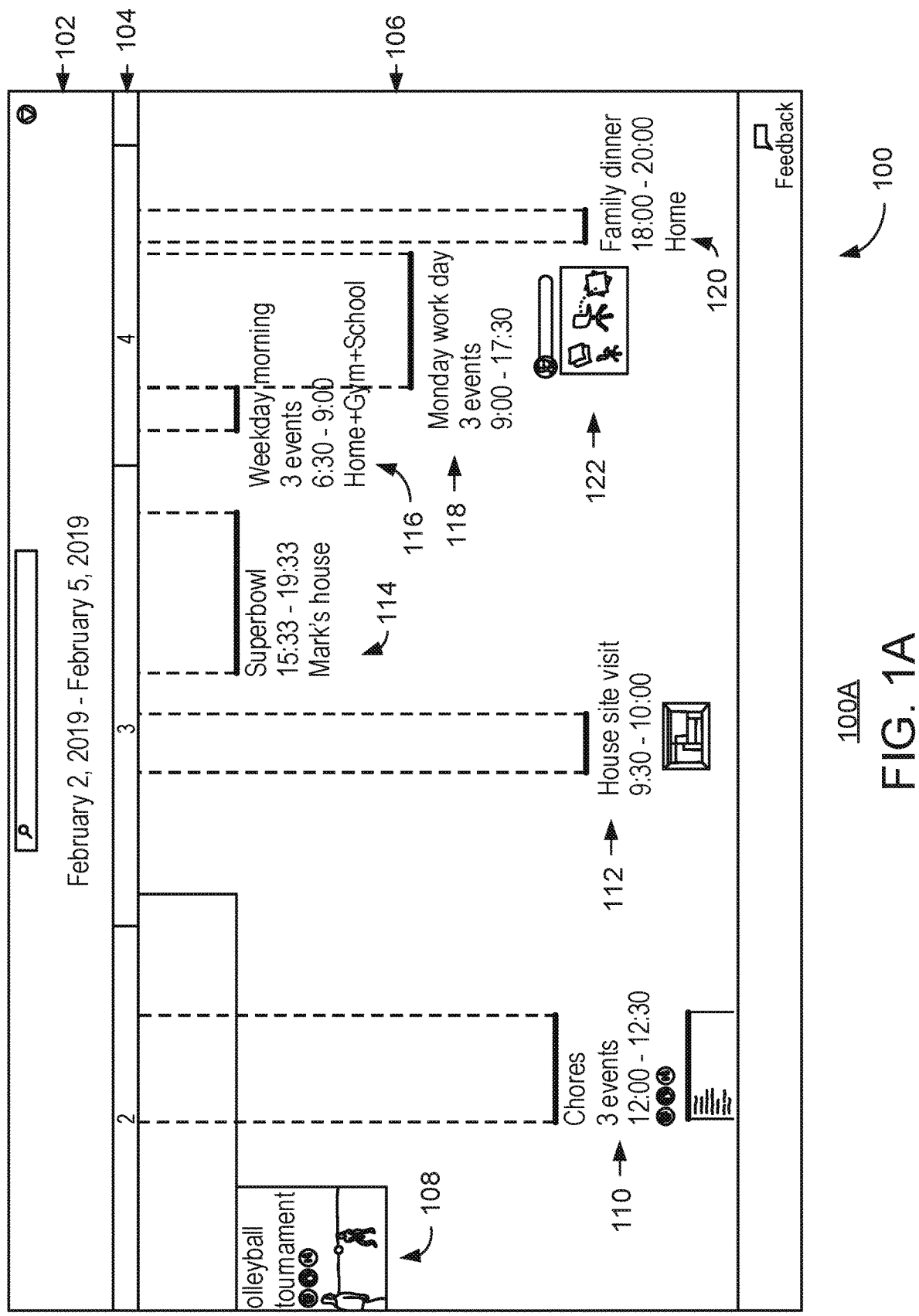
FIG. 1A is a block diagram of a map calendar with a day-based time organization.

A calendar is a system of organizing time. Specifically, a calendar applies known labels to periods of time. For example, time may be divided into a plurality of seconds, minutes, hours, days, and years. Each second may be defined as 9,192,631,770 vibrations of a cesium atom, with a standard day having roughly 86,400 of these seconds. At various points in time, a leap second is added to the day to maintain the correct time in view of variations in the vibrations of a cesium atom, which ultimately depends on the Earth's rotation. As a result, leap values, such as a leap second, leap day, and a leap year, serve as a correction mechanism added to a calendar to compensate for variation in the Earth's rotation, including the gradual slowing of rotation. Seconds may be further grouped and labeled as minutes and hours, depending on the number of seconds in each group. Seconds may also be split into fractional parts. In particular, unit prefixes from the metric system may denote fractions of a second. For example, a millisecond refers to one thousandth of a second.

Most calendar systems recognize a day as the period of time it takes the Earth to complete one full rotation around its axis. Thus, a day is roughly a 24-hour period that begins at midnight of one day and ends at midnight of the next day. A day has a prescribed number of seconds divided into a particular number of minutes and hours. Further, each day includes a period of light and a period of darkness according to the solar and lunar cycles of the Earth. In some contexts, the term day may refer to the period of light in a 24-hour day. Similarly, the term night refers to the period of darkness in a 24-hour day.

A week is generally recognized as a period of time that includes a plurality of days. For example, in the Gregorian calendar system, one week is a period of seven days. Other calendar systems may have weeks with other numbers of days. A week may also be described as a cyclic period that includes a group of days, such as a number of work days and a number of rest days. A plurality of weeks may be further grouped and labeled as a month or a year, depending on the number of weeks. Generally, a month is a unit of time that corresponds to the lunar cycle of the Earth. Earth's lunar cycle is generally governed by the orbit of the moon around the Earth. Similarly, a year is the label given to the time it takes the Earth to orbit one revolution around the sun. A year includes a set number of seconds, days, weeks, and months. Various calendar systems may define a year through different units of measure.

Traditional calendar systems were initially documented on paper. In particular, these calendar systems exploited the cyclic nature of time and applied those cycles to the visual recordation of time. For example, a group of seven days may repeat during the course of a year. Each group of seven days may be referred to as a week. A group of approximately four weeks may repeat during the course of a year. Each group of four weeks may be referred to as a month. Moreover, months may repeat during the course of a year. A group of 12 months may be referred to as a year. Further, groups of years may be recognized as various time periods.

In electronic form, calendar systems follow the same cyclic patterns established by paper calendars. In particular, traditional electronic calendar systems also include groupings of days, weeks, and years. The traditional electronic calendar systems can enable views of time according to each unit of time. For example, with a traditional electronic calendar system, a user can view a particular day and the events scheduled for that day. Traditionally, a user may also view a month. The conventional month view typically renders the days of the month in a two-dimensional format. Finally, years are viewable in a traditional electronic calendar system as a grouping of several months. In some cases, each year is a plurality of months rendered in a sequential fashion. Thus, in a traditional electronic calendar system, measures of time are illustrated as a two-dimensional block diagram.

The present techniques enable a digital map calendar user interface. The digital map calendar is a system for organizing time. In examples, the digital map calendar user interface is an extension of widely accepted calendar systems as described below. As described herein, the present techniques organize an electronic representation of time into a continuous, manipulatable sequence of data. In particular, the manipulation of the map calendar enables real time shifting or conversion of the units of time used to render calendar content. The calendar system according to the present techniques is able to be panned as though moving across a panorama. Furthermore, the calendar system according to the present techniques is zoomable, where a user can zoom-in or out to view time organized in different units. Moreover, the present techniques enable relationships between calendar content rendered by the map calendar system, including events.

Figure 7:
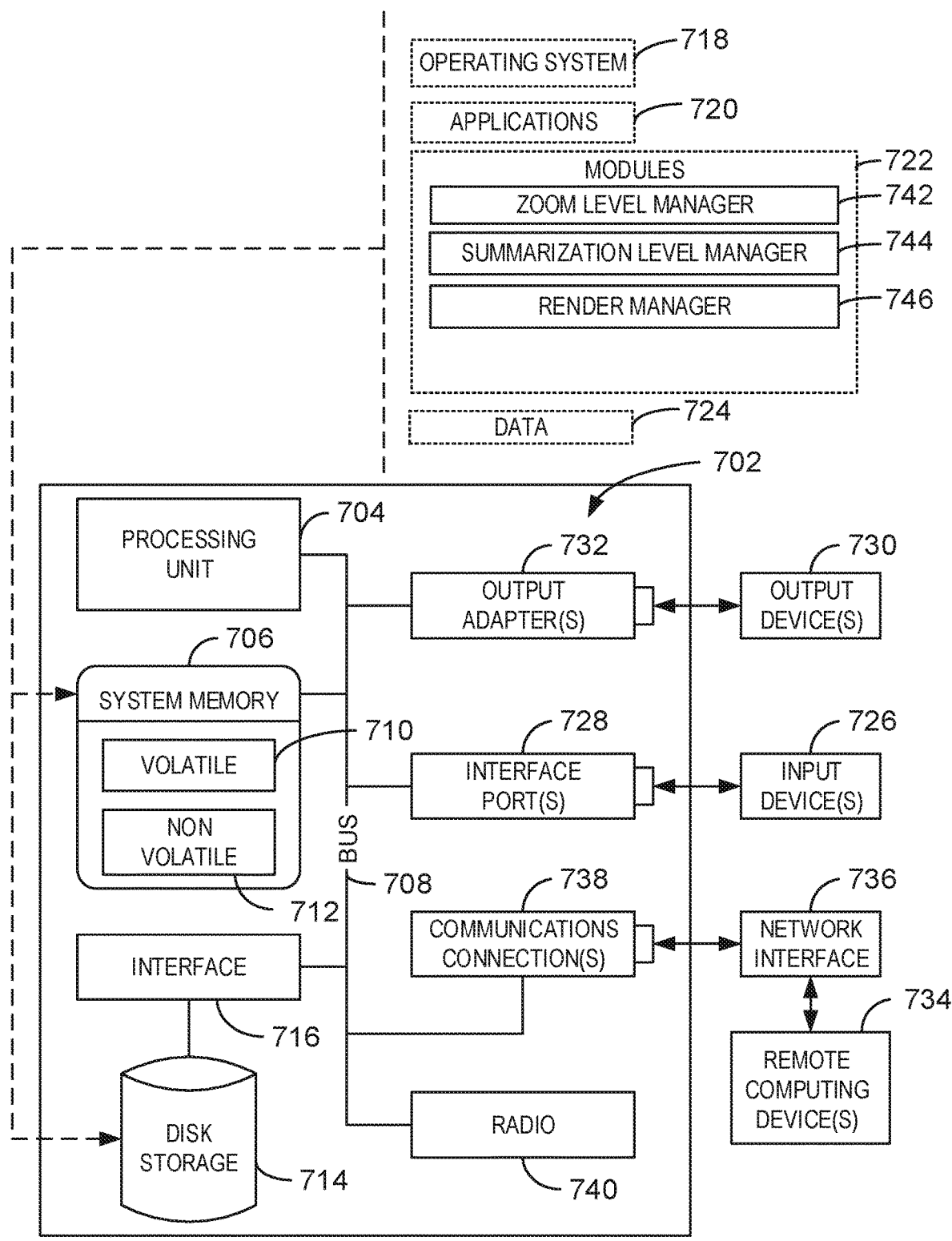
FIG. 7 is a block diagram of an example of a computing system that can enable a map calendar.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 7 discussed below, provides details regarding different systems that may be used to implement the functions shown in the figures.

Other figures may describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, medium, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like. The communication media may include cables, such as fiber optic cables, coaxial cables, twisted-pair cables, and the like. Moreover, transmission media for wireless signals may include hardware that enables the transmission of wireless signals such as broadcast radio waves, cellular radio waves, microwaves, and infrared signals. In some cases, the transmission media for wireless signals is a component of a physical layer of a networking stack of an electronic device.

FIG. 1A is a block diagram of a map calendar 100 with a day-based time representation. The map calendar 100 may be rendered on a view 100A of a display of an electronic device, such as the computing device 702 of FIG. 7. The view 100A rendered at the display may be manipulated via input from a user. Manipulation of the map calendar may be defined as a continuous movement of a calendar view. The manipulation can result in the addition of calendar content to the calendar view, or the manipulation can result in the subtraction of calendar content from the calendar view. Moreover, the manipulation of the calendar content may result in any combination of addition or subtraction of the calendar content. As used herein, continuous refers to a smooth, unbroken transition from a first calendar view to a second calendar view. Rendered calendar content is updated in response to a manipulation in a seamless, visually unbroken manner.

For example, a user may pan or scroll along an axis of time presented by the map calendar. In this manipulation, content is added to and subtracted from the calendar view as the view changes to render future or past calendar content at differing times according to the same time unit. A user may also zoom-in or zoom-out of a time representation presented in a view by the map calendar. In embodiments, a zoom-in function results in increasingly smaller units of time rendered by the map calendar. Conversely, a zoom-out function results in increasingly larger units of time rendered by the map calendar. In a zoom type manipulation, content is added to or subtracted from the calendar view as the view changes to render future or past calendar content at substantially the same points in time, using differing time units. In this manner, the map calendar is a dynamic organization of time that can be manipulated by a user. The organization of time enabled by the map calendar is not limited by the particular format of the calendar system. In particular, the time units may be according to any calendar system. The present techniques also enable a toggle between different calendar systems. For example, a calendar view may be rendered according to a Gregorian calendar system and then toggled to render the same calendar view according to a Japanese calendar system, where the Japanese calendar system includes representing time based on the reign of the current Emperor.

Generally, the map calendar according to the present techniques organizes calendar content using a coordinate plane. The coordinate plane may be considered a grid that is used to convey time information associated with content to be rendered by the map calendar. Thus, the map calendar can include a horizontal axis and a vertical axis. The horizontal axis and the vertical axis are perpendicular to each other. The horizontal axis may be generally referred to as the X-axis, and the vertical axis may be generally referred to as the Y-axis. According to the present techniques, the X-axis of the map calendar represents time. In the example of FIGS. 1A-1D, a time value may increase when moving from left to right along the x-axis of the map calendar 100. For ease of description, the present techniques describe time as being a unit of measure along the X-axis. However, time can be organized along either the X-axis or the Y-axis, and the map calendar according to the present techniques should not be viewed as limited by a particular axis of the coordinate plane. Moreover, the remaining axis (the axis other than the axis used to represent time) is not limited to the representation of a particular value. The remaining axis can be modified according to rules and user preferences as described herein. In embodiments, the remaining axis (the Y-axis in the example of FIGS. 1A-1D) is used to partition the calendar content according to a calendar content type. For example, content items from a work calendar may be referred to as work-type content items, while content items from a school calendar may be referred to as school-type content items. The differing content item types may be rendered at different positions along Y-axis according to type. As used herein, a content item type refers to a category associated with the content item. The content item type includes, but is not limited to, locations, people, sources, and levels of time.

The map calendar 100 includes a label section 102, a header section 104, and an event section 106. For ease of description, the label section 102, the header section 104, and the event section 106 are positioned in certain layout. In particular, the label section is illustrated at the top of the rendered map calendar 100, with the header section 104 immediately below the label section 102. Further, section 106 is illustrated as immediately below the header section 104. However, the present techniques are not limited to the particular layout illustrated in the Figures. Rather, the label section 102, the header section 104, and the event section 106 can be positioned at any location in the rendered map calendar 100. Moreover, some sections may be hidden or otherwise removed from the map calendar.

In the illustration of FIG. 1A, the label section 102 provides labels or names associated with the particular unit of time presently rendered by the map calendar 100. For example, the label section 102 of FIG. 1A is illustrated as including Feb. 2, 2019 through Feb. 5, 2019. Accordingly, the map calendar 100 includes events that occur on days from Feb. 2, 2019 through Feb. 5, 2019. The label section 102 will update in response to the user manipulating the calendar view within the event section 106. For example, if content for a single day is rendered by the map calendar 100 in the events section 106, the label section 102 will provide a particular label or name corresponding to the currently rendered day. Similarly, if a single year is rendered, the label section 102 will update to reflect the particular year being rendered. Accordingly, the label section 102 enables a dynamic labeling function that corresponds to the unit of time rendered in the calendar view. Additionally, the label rendered by the label section 102 may be approximate, where the label to be rendered is selected based on a closest or nearest unit of time rendered in the calendar view.

The header section 104 renders the particular units of time along the X-axis. In particular, the header section 104 is illustrated as including header blocks with units of time designated in the header. In the example of FIG. 1A, the label section 102 of FIG. 1A denotes three days in February as being illustrated. The header section 104 further segments the period of days indicated by the label section 102. In particular, the numbers two, three, and four, are illustrated in headers of the header section 104. These numbers in the header section 104 correspond to enumerated days of the month of February indicated by the label section 102. A portion of Feb. 5, 2019 is also illustrated in the header section 104, however the header for the fifth day of February is not completely in view in FIG. 1A. Accordingly, the number five for this portion of the header is not visible.

The events section 106 includes calendar content such as events associated with particular times that occur during Feb. 2, 2019 through Feb. 5, 2019. As used herein, an event is a circumstance associated with a general time frame. An event is calendar content, where other examples of calendar content include but are not limited to, media content such as photographs, audio, video, animations, social networking blurbs (such as social status updates and tweets), links such as links to other applications, web-browsing history, reminders, documents, and the like. Calendar content may also include applications that are embedded in the calendar surface. Applications embedded in the calendar surface execute within execution context of the calendar. Executing an application in with the execution context of the calendar does not require the opening and execution of the application outside of the calendar. For example, a drawing application may be considered calendar content. The drawing application enables a user to share drawings with other users of the same calendar. The drawing functionality may be executed within the calendar, without opening a separate instance of the drawing application. Further, calendar content can also include "To-Do" item or a "Task" item. A To-Do and Task items are generally calendar content that indicate to a user a specific action that should be taken by the user prior to a specific deadline. By contrast, an event is a circumstance which may or may not include a specific action associated with a general time frame. The To-Do and Task items can be rendered in a list format, where a user can revise the To-Do and Task items to reflect progress made by the user on completing the items.

Generally, some events may have well defined start and stop times, whereas other events are associated with a general time. In embodiments, calendar content can have relationships with other calendar content as discussed herein. The event relationships, the pan level and the zoom level are factors in how events are rendered in the events section 106. In particular, the relationships, pan level, and zoom level can be used to enable semantic and intelligent summarization are calendar content at described below with in relation to FIGS. 2A-4.

As illustrated on the view 100A, the map calendar 100 includes a plurality of events. Specifically, the map calendar 100 includes event 108, event 110, event 112, event 114, event 116, event 118, event 120, and event 122. Each of the events are illustrated along in the X-axis of the map calendar according to their scheduled occurrence in time. For example, the event 108 begins at some point in time on Feb. 2, 2019. However, this point in time is not visible in the current view of the map calendar 100. Further, the event 108 may extend into the beginning of Feb. 3, 2019. Accordingly, the event 108 spans a time period across a boundary between Feb. 2, 2019 and Feb. 3, 2019.

The event 110 is rendered under the header block 2 of the header section 104 corresponding to Feb. 2, 2019. The event 110 has a description block that provides additional details regarding the event. In particular, the event 110 has a title of "Chores," and includes three child events as indicated by the enumeration portion of the description block. Because the event 110 is associated with at least one other event as indicated by the event enumeration portion of the description block, the event 110 may be considered a parent event. The additional events identified by the event enumeration portion of a parent event may be referred to as child events. In embodiments, a child event may also be a parent event. The description block for event 110 also includes a time indication portion. The time indication portion of the description block gives a specific time unit associated with event 110. Here, the event 110 is associated with a period of time from 1200 to 1230 hours. The description block also includes additional calendar content, such as pictures, videos, animations, graphic interchange format (GIF) files, or any other content that is associated with the event 110. For example, an avatar may be rendered to represent a person involved in the event "Chores." A thumbnail image representing a link to documents or other information related to the event "Chores" may also be provided. The calendar content enables users to click links rendered directly in the map calendar to access additional content associated with the particular calendar event. The calendar content may also enable execution of a second application from the calendar view within the execution context of the calendar.

Event 112 is rendered under the header block three of the header section 104 corresponding to Feb. 3, 2019. The event 112 has a description block that provides additional details regarding the events. In particular, the event 112 has a title of "House Site Visit." The event 112 is associated with a period of time from 930 to 1000 hours of Feb. 3, 2019. The event 112 also includes an image below the description block. In this example, the image may be an image taken during the event 112 and associated with the event according to user preferences or by direct instruction from a user. As illustrated, the event 112 does not include additional events as indicated by an event enumeration portion of the description block. Accordingly, the event 112 is not a parent event. However, in a different view of the map calendar 100, the event 112 may be a child event. The relationship between parent events and child events is further discussed with respect to FIG. 2A.

The event 114 is rendered under the header block three of the header section 104 corresponding to Feb. 3, 2019. The event 114 has a description block that provides additional detail regarding the event. In particular, the event 114 has the title of "SuperBowl." The description block of the event 114 has a time indication portion listing the particular times associated with the event. As illustrated, the event 114 "Superbowl" occurs from 1533 hours to 1933 hours. Additionally, the description block includes a location of "Mark's house." The event 116 is rendered under header block four of the header section 104 corresponding to Feb. 4, 2019. The event 116 has a description block that provides additional details regarding the event. In particular, the event 116 has a title of "Weekday Morning." The event 116 is a parent event that includes three sub events as indicated by the enumeration portion of the description block, with an associated time period from 630 to 900 hours. In the description block associated with the event 116, additional information is provided that reads "Home+Gym+School." This additional information corresponds to the three child events of the parent event 116. The particular child event information rendered in the description block of a parent event may be based on user preferences or as indicated by a user when creating or editing the parent event.

The event 118 is rendered under the header block four of the header section 104 corresponding to Feb. 4, 2019. The event 118 has a description block that includes a title of "Monday work day." An enumeration portion of the description block for event 118 indicates that there are three child events associated with event 118. However, no additional information is rendered in the description block regarding the child events. As illustrated, the event 118 is associated with a time range from 900 to 1730 hours. An event 120 is rendered under the header block four of the header section 104 corresponding to Feb. 4, 2019. The event 120 has a description block that includes a title of "Family dinner." The event 120 is associated with a time range from 1800 to 2000 hours. The description block for event 120 also indicates a location of the event 120 as "Home."

Finally, the event section 106 of the map calendar 100 of FIG. 1A includes a floating event 122. As illustrated in the event section 106, each of the event 108, event 110, event 112, event 114, event 116, event 118, and event 120 are visually connected to the header section 104. For ease of illustration, these events are illustrated as visually linked to the header section 104 via dashed or solid lines that extend from the header section 104 along the Y-axis, and down to a particular point within the event section 106. The visual link of events to particular points along the header section 104 associates the events with particular time points along the header section 104. This visual correspondence may be illustrated via a color blocking scheme, where a block of time along the X-axis is color coded to indicate association with a particular event. Moreover, the boundaries or termination of the visual correspondence along the X-axis may be illustrated as gradual or as fading in response to an event having a flexible start time or a flexible end time. Put another way, the start or stop times associated with an event may be referred to as fuzzy. In an example, event 108 is illustrated with a solid line representing an endpoint of event 108 on Feb. 3, 2019. This solid line may represent a clearly defined, hard stop time of the event 108. By contrast, the event 110 is illustrated with a start point on Feb. 2, 2019 with a dashed line and an endpoint on Feb. 2, 2019 with a dashed line. The two dashed lines are a gradient-based start or stop that indicates a flexible start and stop time for the event 110. As a result, the event 110 may be referred to as a fuzzy event.

The floating event 122 is not associated with any particular start and stop time. Instead, floating events can be placed in a region of time but are not anchored to a specific time range. These events may be generally associated with a zoom-level at which the circumstance they represent are relevant. These floating events will appear and disappear as the user zooms in and out, similar to the other events with generally identified start/end times. For example, a floating event associated with approving employee expense requests may be an ongoing commitment, completed weekly after requests are submitted by employees. Such an event is rendered at a day-based view of the calendar. However, this floating event may be hidden at zoom levels that render a week or more of time. In embodiments, the floating event may float throughout various views of the map calendar 100. The floating event may also be disabled in various views of the map calendar 100. As illustrated, the floating event 122 may be a child event of event 118. In embodiments, floating events may recur as needed in different views of the map calendar as indicated by user preferences and event relationships. A floating event represents a scenario where a user wants to remember to do something in a rough time frame but does not have a specific start time in mind. A rough time frame may include, but is not limited to, evening, morning, midday, around noon, after 9 pm, weekly, bi-monthly, quarterly, and the like. Accordingly, a rough time frame is an approximation of a time period. Examples of floating events include signing a permission slip that a child gets at school, remembering to call family members, etc. At a larger zoom scale, a user might add a floating event as a placeholder for a vacation a couple of years in the future, such as in the summer of 2021.

Figure 1B:
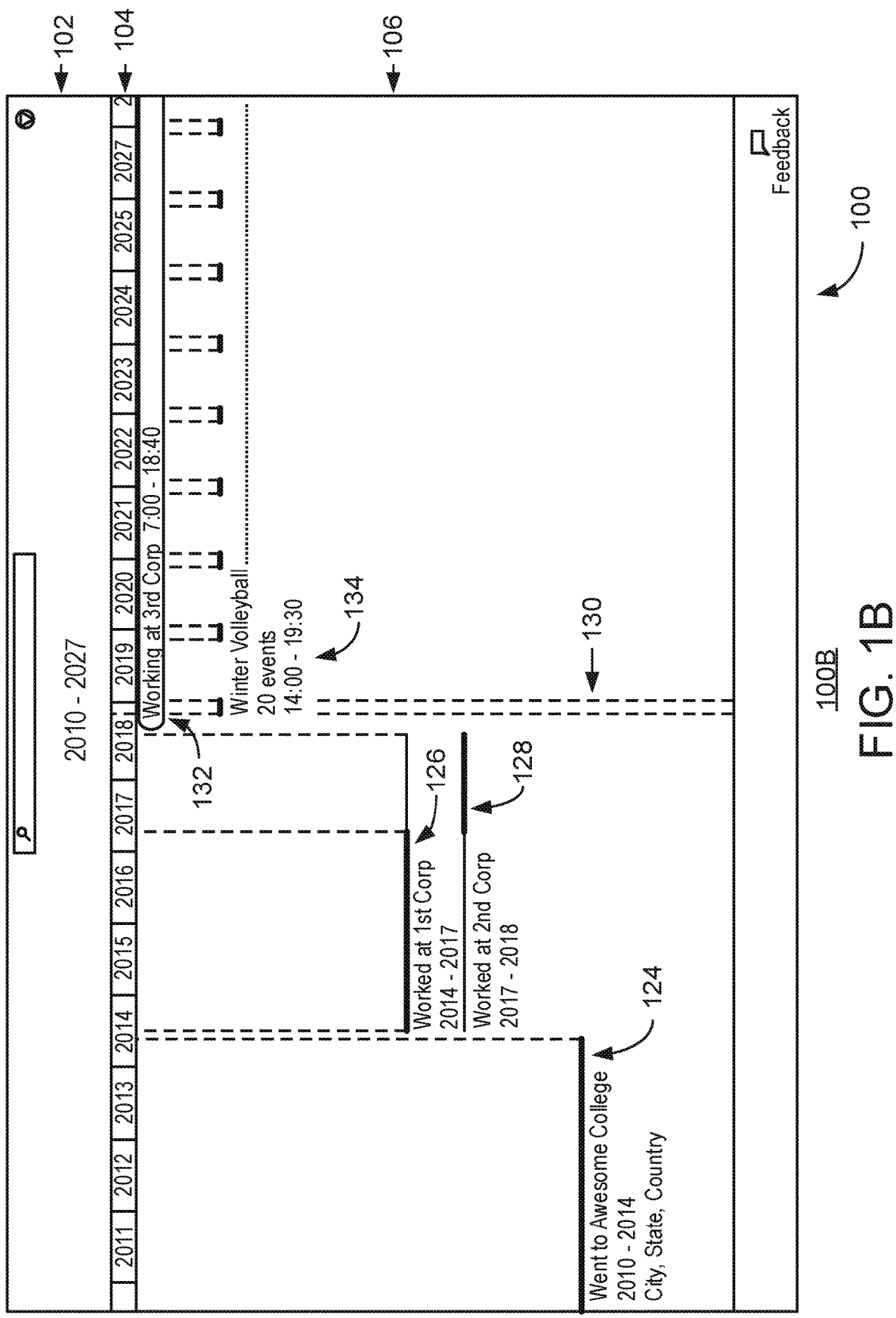
FIG. 1B is a block diagram of the map calendar with a year-based time organization.

FIG. 1B is a block diagram of the map calendar 100 with a year-based time organization. The map calendar 100 in FIG. 1B may be rendered on a view 100B of an electronic device. The view rendered at the view 100B may be manipulated via input from a user. In examples the map calendar 100 in FIG. 1B is a different view of the map calendar 100 as illustrated in FIG. 1A. However, in FIG. 1B a zoom-out function has changed the calendar view to a year-based organization system.

Accordingly, the label section 102 of FIG. 1B provides labels or names associated with the particular level of time organization presently rendered by the current view of the map calendar 100. The label section 102 of FIG. 1B is illustrated as including 2010 through 2027. In a traditional Gregorian calendar system, 2010 through 2027 is quickly recognized as a time period of years. Accordingly, the label section 102 renders a period of time associated with a number of years. The corresponding header section 104 includes header blocks where each header block corresponds to a year.

The events section 106 of FIG. 1B includes event 124, event 126, event 128, marker 130, event 132 and event 134. The event 124 has a description block that includes a title, a period of time, and a location. In particular, the title of the description block of event 124 is "Went to Awesome College." The time range in the description block of event 124 is from 2010 to 2014. Note that the header block 2010 of the header section 104 is not completely visible in the view 100B. Accordingly, only a portion of the event 124 is rendered on the view 100B.

An event 126 includes a description block with the title "Worked at 1st Corp" and a time range from 2014 to 2017. Similarly, an event 128 corresponds to a description block with the title "Worked at $2^{nd}$ Corp" with a time range from 2017 to 2018. In the illustration of FIG. 1B, event 126 and event 128 are illustrated as rafted. Rafting is further described in relation to FIGS. 3A-4 below. A marker 130 may be rendered in a map calendar 100 view to indicate the current point in time. For example, in the illustration of FIG. 1B, the marker 130 represents a current point in time at the end of calendar year 2018. In embodiments, events that are in the past may be rendered according to different rules, user preferences, and other parameters when compared to future events, and vice versa.

Event 132 is illustrated using a description line. In embodiments, a description line may be rendered for events of calendar content that include sparse details. For example, the title of the description line associated with event 132 is "Working at 3rd Corp," with an hour time range from 700 hours to 1840 hours. The event 132 may be a high priority event, one that is expected to continue into perpetuity. Accordingly, when a user enters such an event in the map calendar, it may be rendered in as many views as possible since it is a high priority event. Similarly, the event 134 is associated with a description block that includes a title of "Winter Volleyball," and includes 20 child events. An hourly time range from 1400 to 1900 hours is associated with the event 134. Similar to the event 132, a user may indicate that the event 134 is a high priority event that is to be included in each map calendar view of a particular level. In addition to a user indicating the priority of an event, the map calendar may determine the priority of an event based on machine learning to determine the priority across events.

Figure 1C:
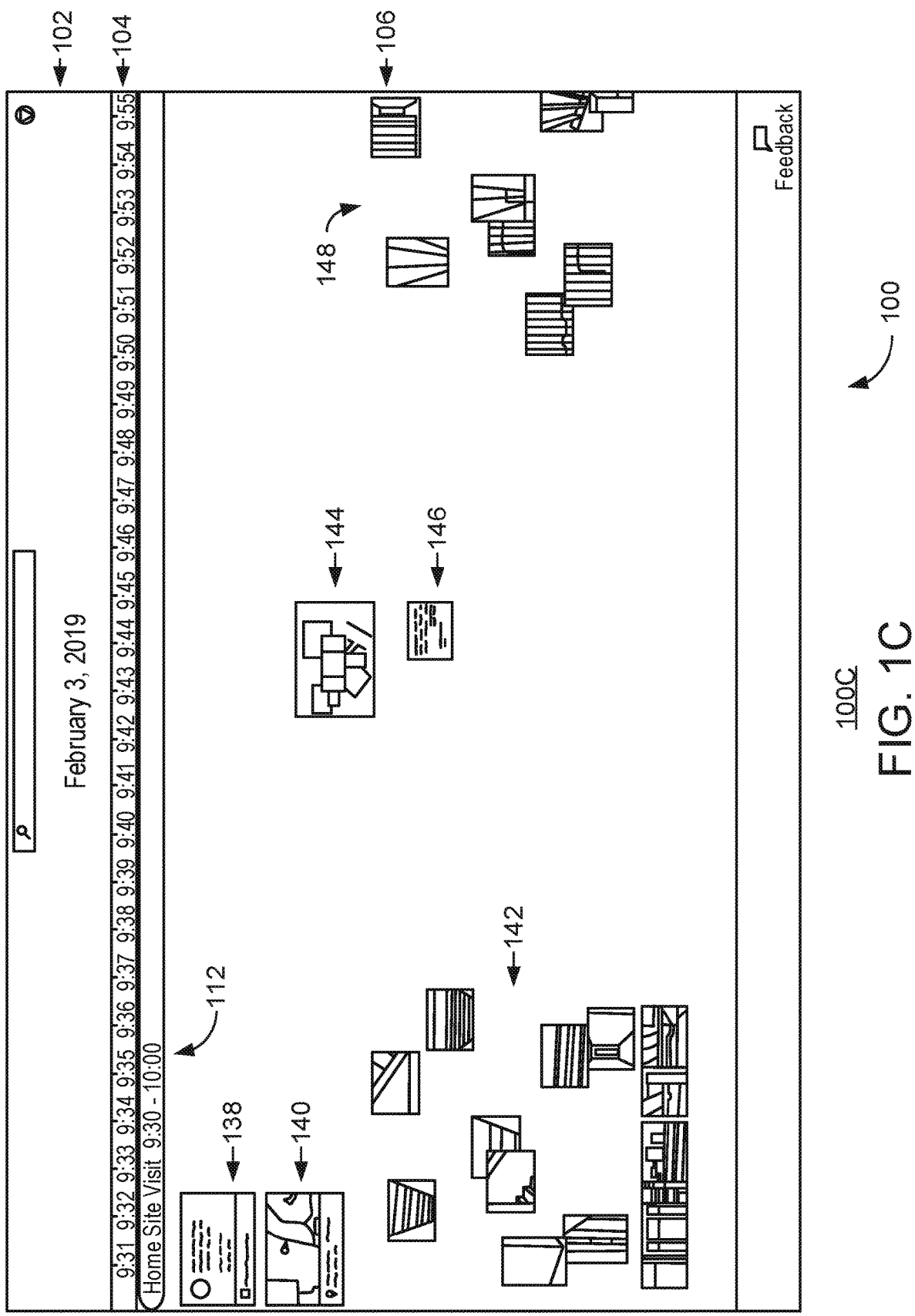
FIG. 1C is a block diagram of the map calendar with a minute-based time organization.

FIG. 1C is a block diagram of the map calendar 100 with a minute-based time organization. The map calendar 100 in FIG. 10 may be rendered on a view 100C on a display of an electronic device. The view 100C may be manipulated via input from a user. For example, the user may pan across time or the user may zoom-in on a particular time instance. Consider the scenario where a user initially has a view 100A and would like to "zoom-in" on a period of time during the event 112, titled "House Site Visit." One result of zooming-in on event 112 of FIG. 1A is the view 100C as illustrated in FIG. 1C.

In FIG. 1C, the label section 102 indicates that the name or label associated with the presently displayed time period is Feb. 3, 2019. While a particular day is rendered, the label given in the section 102 can refer to many different labels associated with the unit of time used to render the calendar content. For example, the label section 102 could read "Morning of Feb. 3, 2019." In other examples the label that is rendered in the view 100C may read "Sunday, Feb. 3, 2019." Another example, the label in the label section 102 may also read "Sixth Week of 2019." In embodiments the labels may change according to various calendar systems and other time representations.

The header section 104 of FIG. 1C includes a plurality of blocks, where each block represents a minute of time. In the example of FIG. 1C, the event 112 is associated with a description line. The description line provides the title of the event along with a time range associated with the event. A plurality of calendar content items can be associated with the event 112. The calendar content items can be associated with the event 112 either before, during, or after the event. As illustrated, the event 112 is associated with calendar content 138, calendar content 140, calendar content 142, calendar content 144, calendar content 146, and calendar content 148. In examples, the calendar content 148 and the calendar content 140 may be calendar content items that are associated with the event 112 prior to the events. For example, a document associated with the house site visit may be accessed through a link corresponding to a thumbnail image rendered in the events section 106 of the map calendar 100. The thumbnail image may be calendar content 138. Similarly, a link to calendar content, such as a checklist of items to view during the house site visit, maybe located at the thumbnail image representing calendar content 140.

During the event 112, a number of content items may be gathered. For example, a plurality of pictures may be captured during the event 112. Accordingly, calendar content 142 corresponds to a group of pictures captured during the event 112. This captured calendar content may have timestamps associated with the time period indicated in the header section 104. In particular, the photographs of calendar content 142 may have timestamps within the time period from 930 hours to 937 hours. This calendar content may be obtained from a number of sources. For example, the calendar content may be locally captured by the electronic device, retrieved from a network source, or retrieved from another application co-located on the electronic device. In embodiments, a user may indicate preferences for obtaining additional calendar content. For example, with user permission, calendar content may be sourced from storage, memory, other applications of the electronic device, and the like. Calendar content may also be sourced from social networking applications and other sources as designated by a user.

In the view 100C, calendar content 144 and calendar content 146 are associated with a timeframe from approximately 942 hours to 946 hours. In examples, the calendar content 144 may be a blueprint of the home subjected to the site visit during the event 112. Additionally, the calendar content 146 may be a contract document associated with the event 112. Again, each item of calendar content may be represented in the map calendar 100 by a thumbnail associated with a hyperlink that enables access to associated calendar content. The hyperlink may also change the current execution context of the device to a context associated with the calendar content. The calendar content 148 may be similar to the calendar content 142, and may be another group of pictures captured during the event 112.

Figure 1D:
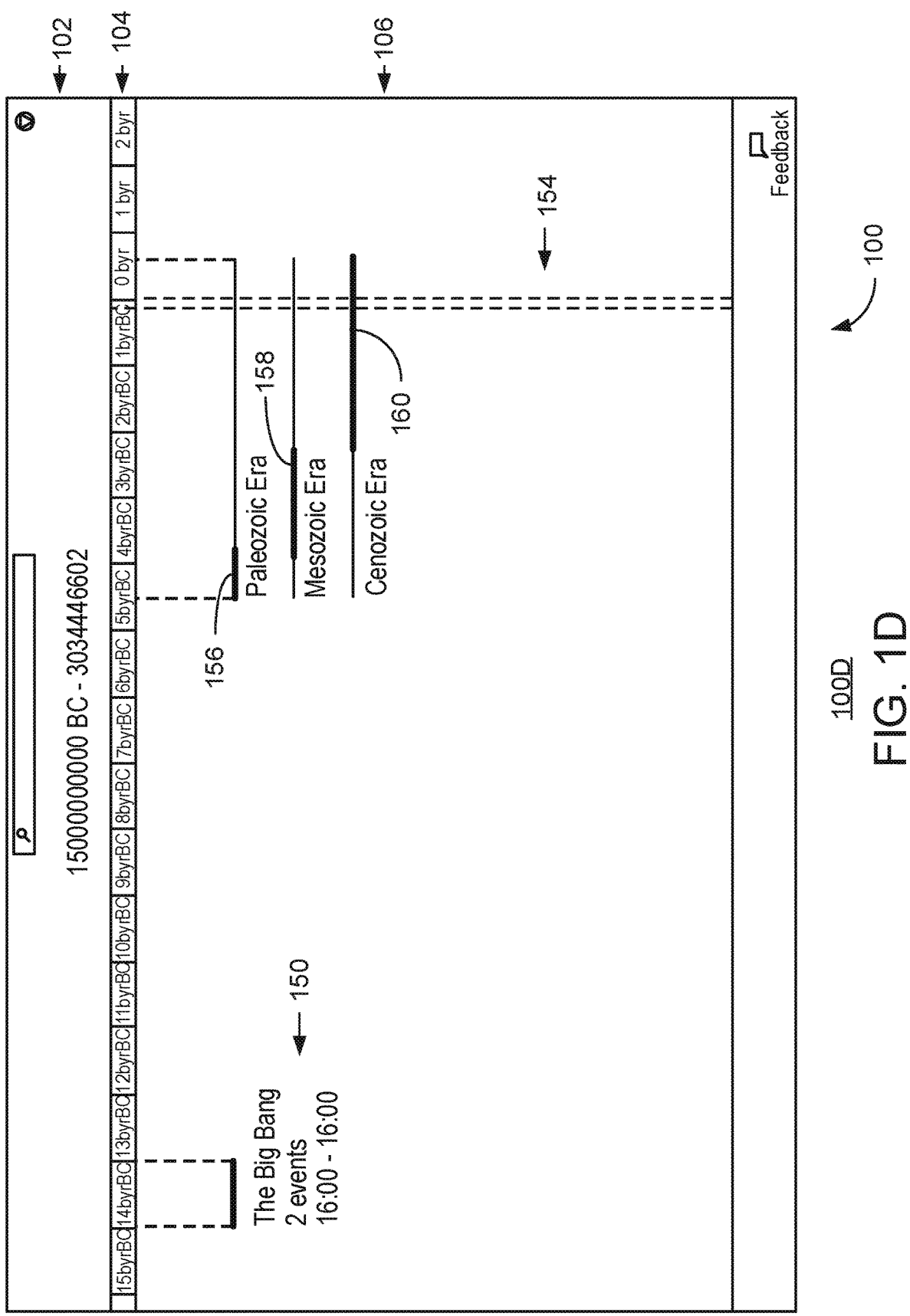
FIG. 1D it is a block diagram of the map calendar billion year-based organization.

FIG. 1D is a block diagram of the map calendar 100 billion year-based organization. In FIG. 1D, the label section 102 indicates that the name associated with the current time view is along the order of billions of years (byr). In particular, the label 102 indicates a time range from 15 billion Before Common Era, to year 3,034,446,602. The header section 104 includes a plurality of header blocks where each block represents a billion years of time. The events section 106 in view 100D of FIG. 1D illustrates a number of historic events. The historic events are rendered in the same manner as other events described above. In particular, the event 150 is associated with a description block and entitled "The Big Bang." Event 150 has two child events. In some examples, historic events can be rendered in a map calendar according to a particular calendar system or a source of the calendar content. Historic events may also be rendered using a description line. Similar to FIGS. 1A-1C, the description line may include a reduced amount of information when compared to a description box associated with an event. The event section 106 also includes a marker 154, an event 156, an event 158 and event 160.

For ease of description, the present techniques are illustrated using the Gregorian calendar system. However, the particular calendar system used in a map calendar view is not limited to the Gregorian calendar system. In examples, labels applied in the label section 102 may be according to any calendar system. For example, the names or labels may be based on calendar systems such as lunar, solar, religious or National calendar systems. Calendar systems may also be based a school calendar, personal sports season calendar, professional sport season calendar, and the like. Additionally, more than one calendar system may be rendered in a map calendar view. In this scenario, the header block 104 may include one or more headers corresponding to the calendar systems represented in the label section 102. Other calendar systems that may be used according to the present techniques include, but are not limited to, the Julian calendar system, Islamic calendar system, Hindu calendar system, Buddhist calendar system, Hebrew calendar system, Baha'i calendar system, and any combination thereof.

Moreover, in the description of FIGS. 1A-1D calendar content including events is illustrated relative to the unit of time along the X-axis. Calendar content may be positioned along the Y-axis as well. In embodiments, units of the Y-axis can change or be manipulated by a user based on different user preferences, rules, and calendar type. For example, when entering a work event to the map calendar, a user may indicate a preference for every work event to have a highest priority when rendered. Accordingly, a display rule for events and other calendar content associated with work may be to render those items to be more prominently displayed when compared to other items with a lower priority. As used herein the term "highest priority" may refer to a particular priority level that is above a standard priority level.

In some cases, semantic and intelligent summarization of calendar content may dictate the position of the calendar content along the Y-axis. In the various calendar views as illustrated here in, each item of calendar content may be subjected to summarization. Semantic summarization refers to a relation of words associated with the calendar content. Intelligent summarization of calendar content may refer to the compressing of calendar content based on ground truths, user preferences, roles, and learned compression techniques.

For example, machine learning may be used to compress or condense calendar content across a number of views.

Figure 2A:
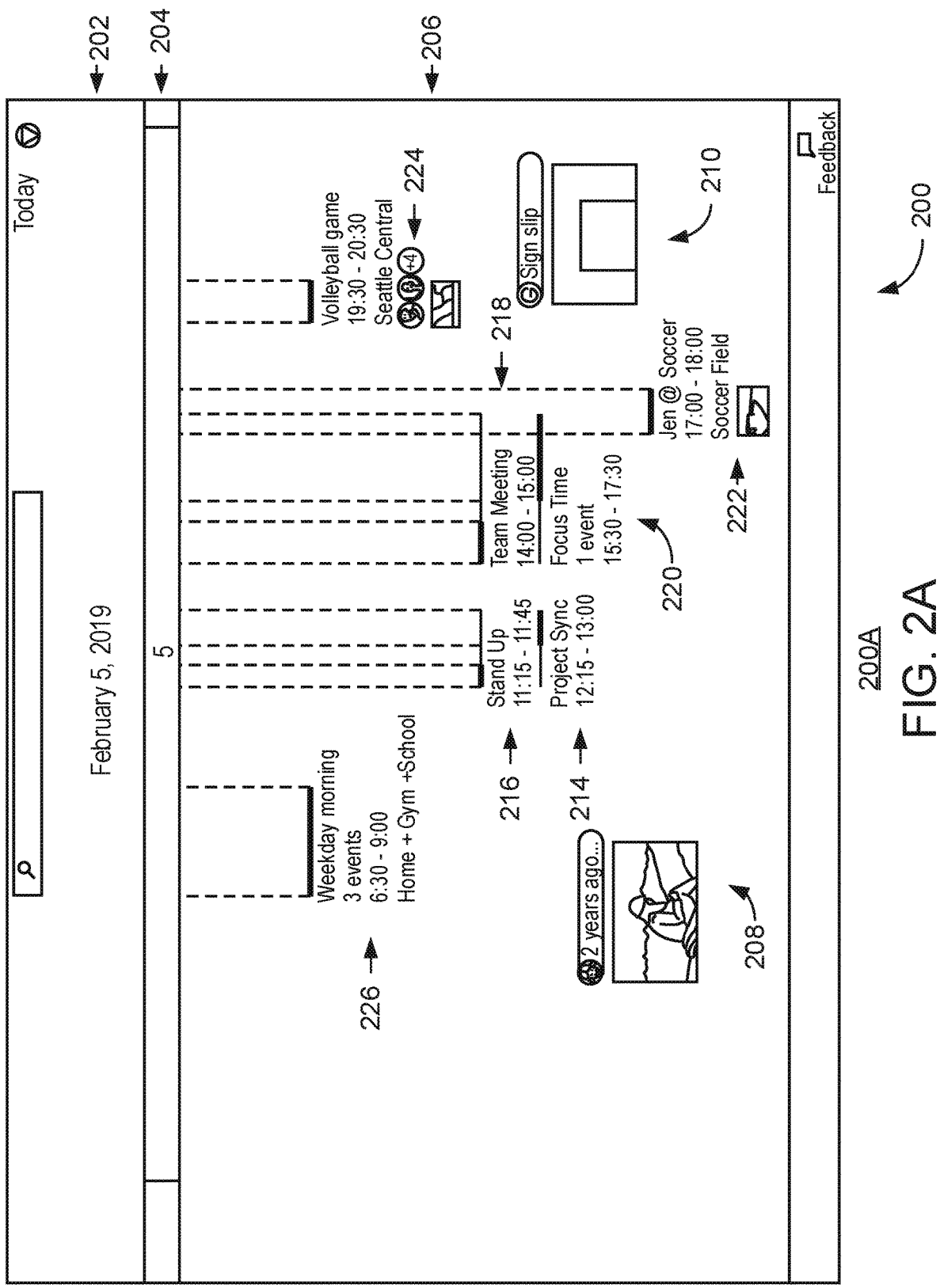
FIG. 2A is a block diagram of a map calendar with a single day-based time organization.

FIG. 2A is a block diagram of the map calendar 200 with a single day-based time organization. The map calendar 200 in FIG. 2A may be rendered in a view 200A of a display of an electronic device. Similar to FIGS. 1A-1D, the map calendar 200 includes a label section 202, a header section 204, and an event section 206. The event section 206 includes a plurality of events. In particular, the event section 206 includes an event 208, event 210, event 214, event 216, event 218, event 220, event 222, event 224 and, event 226. As illustrated, events 208 and 210 are floating events.

In particular, event 208 is a memory event. A memory event is an event that occurred in the past. The memory events may be rendered according to user preferences. In some embodiments, a memory event may be rendered on a current events section in the response to being a high priority event. The event 210 is associated with a description line that states "Sign Slip." Accordingly, the floating event 210 may be a reminder to sign a slip on Feb. 5, 2019.

The events 214, 216, 218, 220, 222, 224 and 226 represent various circumstances over the course of a day for a particular user. Each event may be represented by a description block as described above. Each description block may include various information pertaining to the event. For example, the description block may include a title, the number of events associated with the current event (if any), a time range associated with the current events, and a description of child events or any other information pertaining to the current event. In embodiments, the description block also includes calendar content such as images that are associated with the event.

Relationship between items of calendar content may be according to a parent-child relationship. For example, event 226 is a parent event that is related to three child events. In particular, the event 226 has three child events as indicated by the description block. In embodiments, a parent event may be a semantic parent event. A semantic parent event may refer to the parent event in a parent-child relationship that is understood by humans. For example, consider a user who calendars the following items every weekday morning: (1) Go to the gym, (2) Take my pills, and (3) Drop the kids off at school. When the map calendar is displayed at a single day view, the parent event 226 is rendered in a general, less busy view. However, in a finer, zoomed-in hour-by-hour view, each child event is rendered, thereby enabling a more detailed view of calendar content. The view 200A may be manipulated via input from a user. For example, the user may pan across time or the user may zoom-in on a particular time instance. Consider the scenario where a user initially has a view 200A and would like to "zoom-in" on a period of time during the event 226. View 200B of FIG. 2B illustrates the resulting view.

Figure 2B:
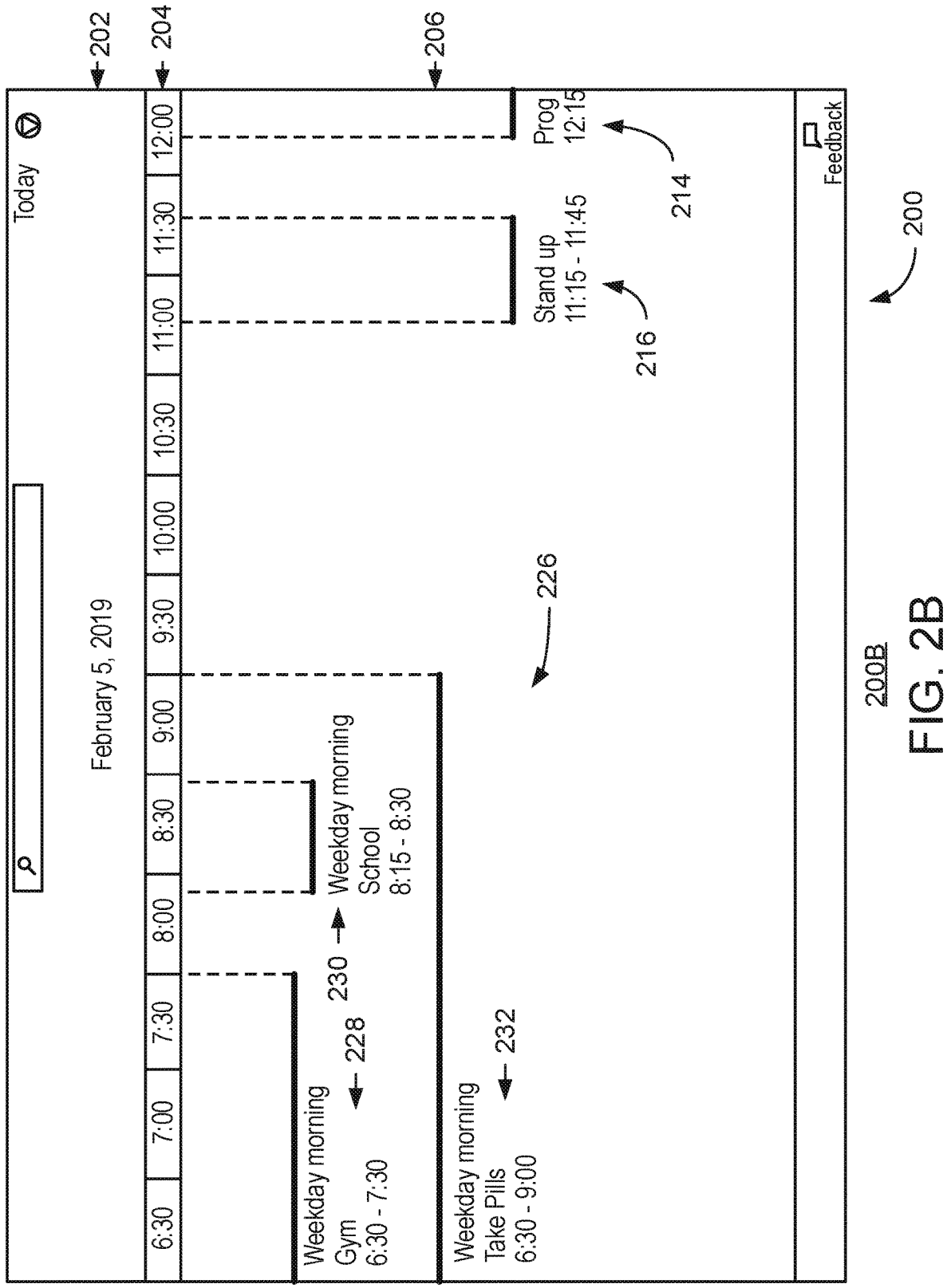
FIG. 2B is a block diagram of the map calendar with a thirty minute-based time organization.

FIG. 2B is a block diagram of the map calendar 200 with a thirty minute-based time organization. The map calendar 200 in FIG. 2B may be rendered on a view 200B of an electronic device. The view rendered at the view 200B may be manipulated via input from a user. In examples, the map calendar 200 in FIG. 2B is a different view of the map calendar 200 as illustrated in FIG. 2A. However, in FIG. 2B a zoom-in function has changed the calendar view to a thirty minute-based organization system. Accordingly, the label section 202 of FIG. 2B provides labels or names associated with the particular level of time organization presently rendered by the current view of the map calendar 200. In particular the label section 202 of FIG. 2B is illustrated as a particular day, Feb. 5, 2019. The header section 204 includes header blocks, where each header block corresponds to a period of thirty minutes.

The events section 206 of FIG. 2B includes event 214, event 216, and event 226. The event section 206 of FIG. 2B further includes child event 228, child event 230, and child event 232. Each of the child event 228, child event 230, and child event 232 is associated with a description block as illustrated. For example, child event 228 is associated with a description block that includes a title "Weekday Morning," a location of "Gym," at a time from 630 hours to 730 hours. Similarly, child event 230 is associated with a description block that includes a title quote "Weekday Morning," a location of "School," and a time period from 815 hours to 830 hours. Finally, the child event 232 is associated with a description block that includes a title "Weekday Morning," an action of "Take Pills," and a time period from 630 hours to 900 hours. While child event 232 is associated with a particular time range, the child event 232 could also be rendered as a floating event that is generally restricted to a time from 630 hours to 900 hours.

An event may be converted to a parent event in response to a manipulation of a calendar view when a possible child event's rendered length is less than a threshold percentage of the overall application width. As the map calendar is manipulated by a zoom function, a transition from the parent event to the children events may be made if the width of the children events would be greater than that threshold percentage. In examples, the width of the overall application as rendered is directly mapped to an amount of time. The width of each event rendered within the overall application width also corresponds to an amount of time, which is the duration or approximate duration of each event. Once the amount of time of an event is below a threshold percentage of the amount of time represented by the width of the application, the larger parent event with a longer duration of time is rendered instead of the child event.

In embodiments, relationship identification between calendar content can be performed manually by a user or based on learned intelligence of the map calendar. Consider the scenario where a user adds a calendar event to the map calendar that requires transit time to get to a particular location associated with the event. Commute time may be automatically added and a parent event created that links to both commutes and the event itself. For example, a user adds a gym class to the calendar, such as "Yoga 7:30 pm-8:30 pm." The present techniques may predict that the gym class will require a commute time greater than a threshold amount, such as 15 minutes. This prediction may be made based on the location of other events rendered by the map calendar or historic location data of the user. A prediction can be made that the gym is in another location and automatically add a placeholder for the commute to and the commute from the class. In this scenario, three events can be rendered on the map calendar: (1) "Drive to yoga studio", (2) "Yoga", and (3) "Drive home." A parent event, "Go to yoga," may be automatically created based on three child events (1) "Drive to yoga studio", (2) "Yoga", and (3) "Drive home." When the user manipulates the map calendar and zooms out, parent event "Go to yoga" is rendered instead of the three child events.

Additionally, switching between parent and children events in different views of the map calendar may be based on event type. For example, if a user wanted to focus on work calendar content, personal events could be automatically rendered by their parent events. During manipulation of the map calendar, personal events could be represented by their parent events at a faster rate than work events, even if they're all the same duration and could be rendered in a similar format based on duration. In this manner, more detail is rendered about a work schedule of the user a zoom-out function occurs, while the personal schedule is collapsed into lower fidelity to save space when the calendar view is rendered.

At different zoom-levels, events with description boxes that are either too short or too long for the current zoom level can be hidden. For example, events that might appear at in minute-by-minute scale (e.g. photos from a digital camera roll of the device) will disappear as the user zooms out to an hour-by-hour scale. Accordingly, events that span days will only appear in multi-day to week views. Moreover, events that span weeks will only appear in multi-week to month views, and so on. The map calendar is scale-independent, so the hide/reveal scheme applies to units of time from seconds all the way up to billions of years, where a user's personal data disappears given its insignificant time span. In deciding when to hide or reveal calendar content across zoom levels, events may be hidden when their width is less than a specified percentage of the overall application window width as a user zooms-in. The calendar content may be revealed as the user zooms out to a point where the width of the description block is again wider than the specified percentage.

In some cases, an event may be hidden or revealed based on additional factors, such as other users associated with the event, the time of day, if the event has a high amount of associated content, and any combinations thereof. For example, the map calendar may hide a short daily sync meeting with a work team as the zoom-out occurs. Such a meeting is regular and often with the same group of people. However, if an important person signs on to attend the meeting, it could change the importance of the meeting. For example, for an employee, the map calendar may render a daily sync meeting that includes the employee's boss's boss in every view of the calendar, regardless of the zoom level.

Figure 3A:
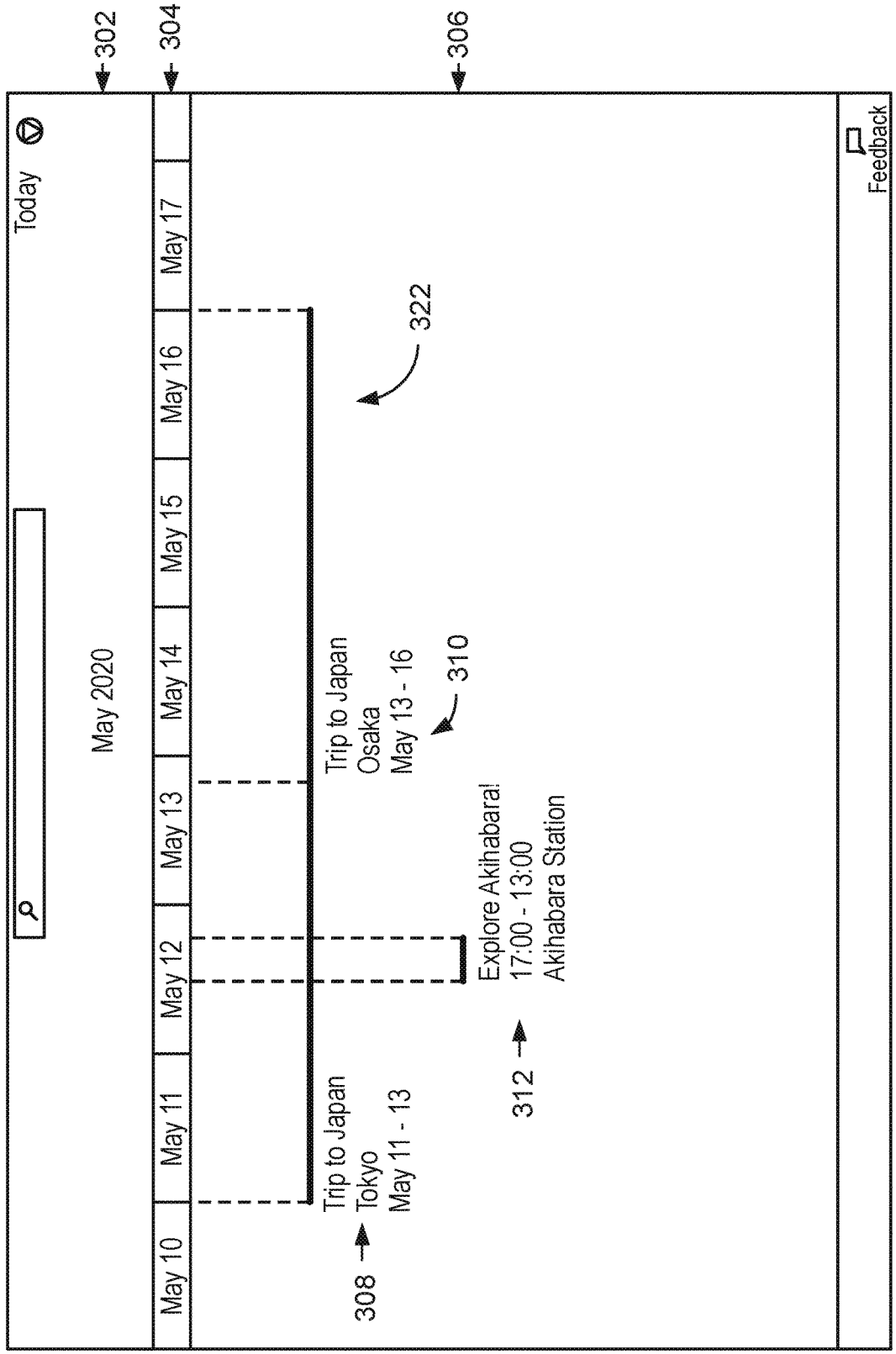
FIG. 3A is a block diagram of a map calendar with a multiple day-based time organization.

FIG. 3A is a block diagram of a map calendar 300 with a multiple day-based time organization. As illustrated, FIG. 3A includes a label section 302, a header section 304, and an events section 306. The label section 302 includes the label "May 2020." The header section 304 illustrates multiple days of May, starting from May 10 through May 17. The event section 306 includes a parent event 322 and two child events. The child event 308 includes a description block with the title "Trip to Japan," a location of "Tokyo," and a time frame from May 11-13. Similarly, the child event 310 includes a description block with the title "Trip to Japan," a location of "Osaka," in a timeframe from May 13-16. Additionally, the event 312 includes a description block with the title "Explore Akihabara!" The description block of the event 312 includes a timeframe from 1700 hrs. to 1800 hrs. and a location of Akihabara Station.

FIG. 3B is a block diagram of a map calendar 300 with a multiple month-based time organization. The map calendar 300 in FIG. 3B may be rendered on a view 300B of an electronic device. The view rendered at the view 300B may be manipulated via input from a user. In examples, the map calendar 300 in FIG. 3B is a different view of the map calendar 300 as illustrated in FIG. 3A. However, in FIG. 3B a zoom-out function has changed the calendar view 300A to a multiple month-based organization system as illustrated by view 300B.

Accordingly, the label section 302 of FIG. 3B provides labels associated with a particular level of time organization presently rendered by the current view of the map calendar 300. In particular, the label section 302 of FIG. 3B is illustrated as a particular range of months, from April 2020 through June 2020. The header section 304 includes header blocks for each header that correspond to a period of one month. The event section 306 of FIG. 3B includes an event 312, event 320, event 322, event 326, event 328, and event 330. The event 322 is a parent event that includes two child events 308 and 310 as illustrated in FIG. 3A.

Figure 4:
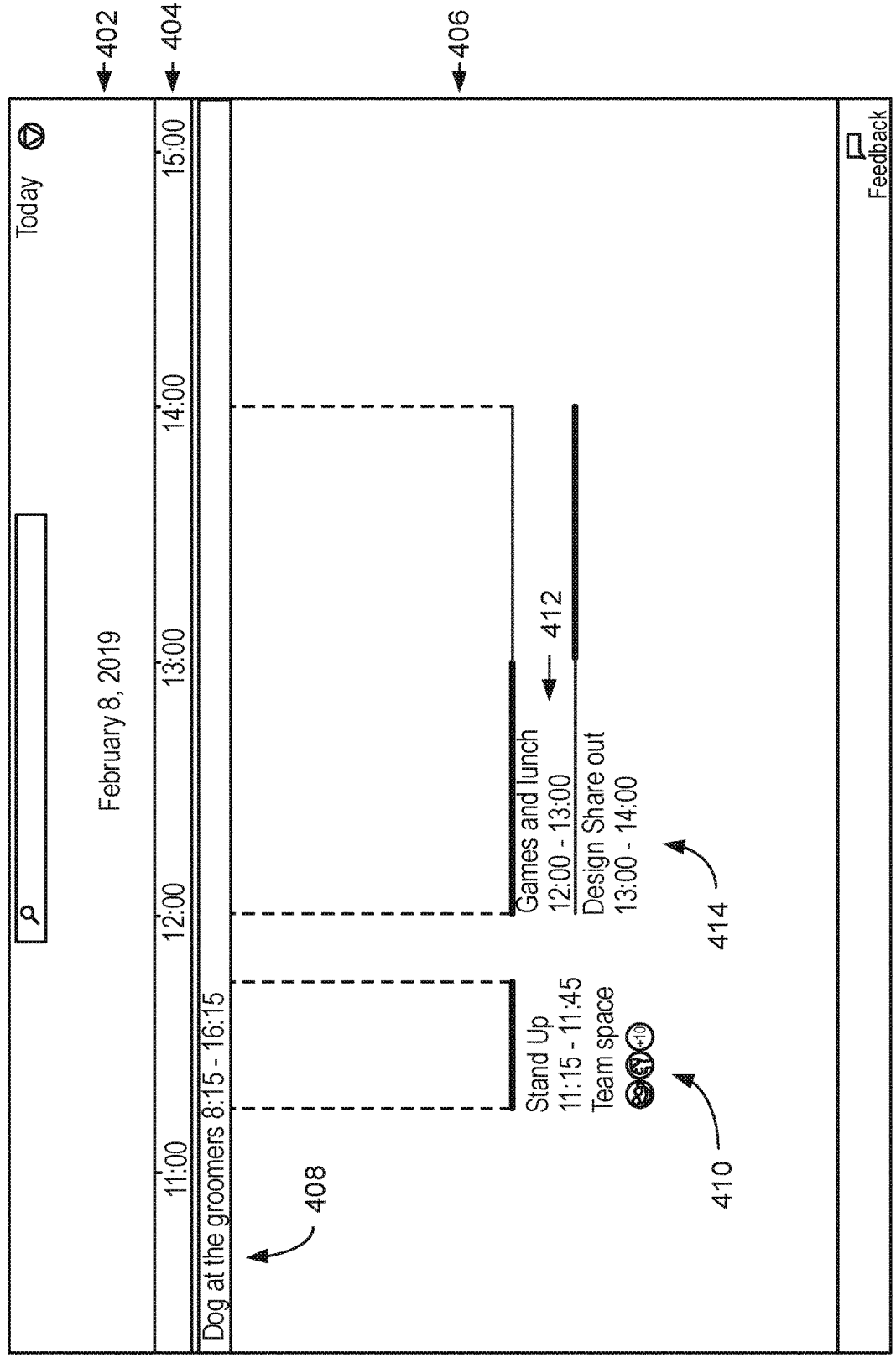
FIG. 4 is a block diagram of a map calendar with a multiple hour-based time organization.

FIG. 4 is a block diagram of a map calendar 400 with a multiple hour-based time organization. As illustrated, FIG. 4 includes a label section 402, a header section 404, and an events section 406. The label section 402 includes the label "Feb. 8, 2019." The header section 404 illustrates multiple hours of Feb. 8, 2019, from 1100 hours through 1500 hours. The event section 406 includes an event 408, event 410, event 412, and event 414. The event 408 includes a description line with the title "Dog at the Groomers," and a time frame from 815-1615 hours. The event 410 includes a description block with the title "Stand Up," a location of "Team Space," and a timeframe from 1115-1145 hours. Additionally, description box of event 410 includes representations of people associated with event 410. Event 412 includes a description box with a title "Games and Lunch," and a timeframe from 1200 to 1300 hrs. Similarly, the description box of event 414 that includes a title "Design Share Out," and a timeframe of 1300 to 1400 hrs.

As illustrated, the event 412 and the event 414 are rafted. The present techniques may "raft" events together when they no longer have enough space to be rendered in a side-by-side format without overlapping or otherwise obscuring text in the description block of the event. In embodiments, events are rafted together that are intended to be revealed at a given zoom level, do not have a semantic parent, and also do not have enough horizontal space at the zoom level to render details in the description box without overlapping. In the example of FIG. 4, the event 410 has enough space to be displayed as a single item. However, the event 412 and the event 414 were deemed to be too close together, so they have formed a "raft."

Figure 5:
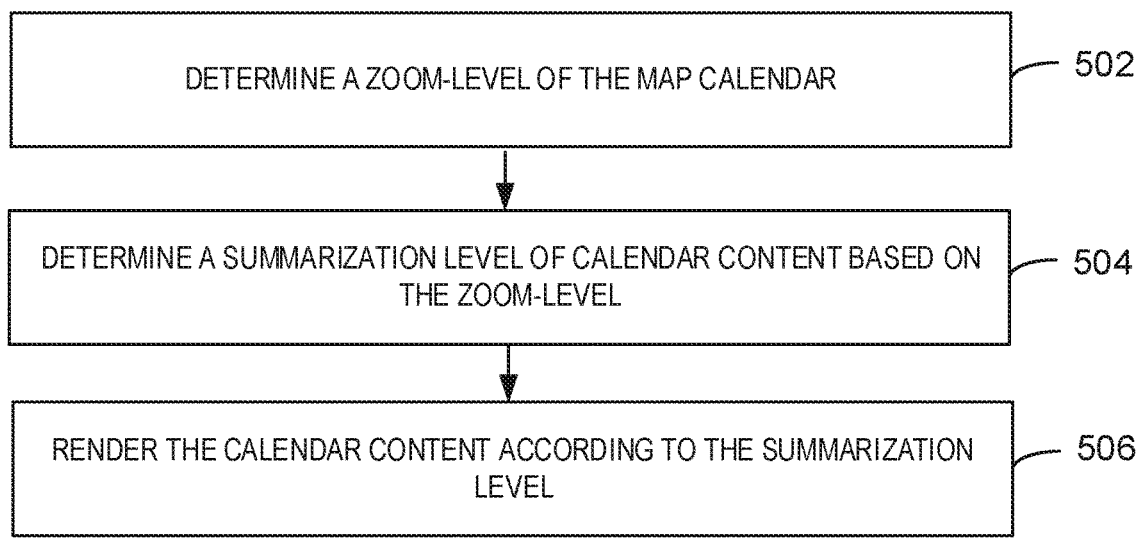
FIG. 5 is a process flow diagram of a method that enables a digital map calendar user interface.

FIG. 5 is a process flow diagram of a method 500 that enables a digital map calendar user interface. At block 502, a zoom level of the map calendar is determined. In embodiments a zoom level of the map calendar is determined based on input from a user. Absent input from a user the current zoom level of the map calendar may be according to user preferences. At block 504, a summarization level of the calendar content is determined based on the zoom level. As discussed above the calendar content may be summarized semantically, intelligently, or any combination thereof. At block 506, the calendar content is rendered according to the summarization level. In this manner, calendar content may be rendered at an electronic device based on a particular set of rules associated with the summarization level. In embodiments, a calendar content database that is to store at least one item of calendar content. A navigation system may be used to determine a zoom level and a panning position of the map calendar.

Figure 6:
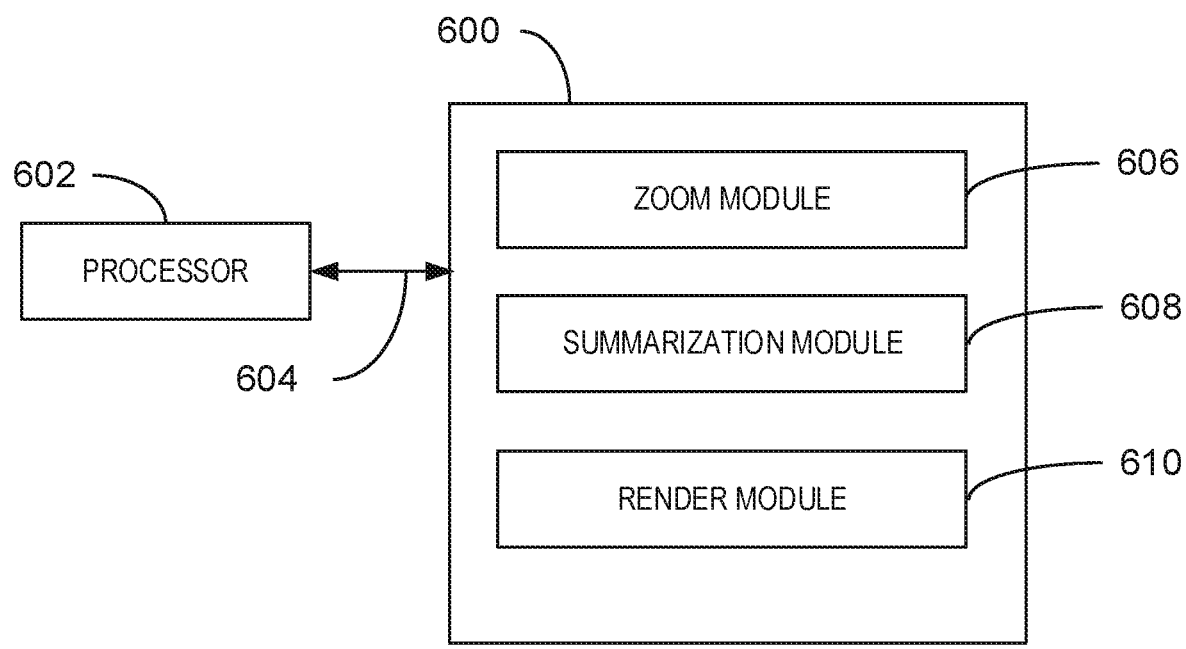
FIG. 6 illustrates a block diagram of a non-transitory computer readable media for that enables a digital map calendar user interface.

FIG. 6 illustrates a block diagram of a non-transitory computer readable media for that enables a digital map calendar user interface. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the current method.

The various software components discussed herein may be stored on the tangible, non-transitory, computer-readable medium 600, as indicated in FIG. 6. For example, a zoom-level module 606 may determine a zoom level of a map calendar. A summarization level module 608 may be configured to determine the summarization level of the calendar content. A render module 610 may be configured to render calendar content according to the particular set of rules associated with the summarization level.

It is to be understood that any suitable number of the software components shown in FIG. 6 may be included within the tangible, computer-readable medium 600. Furthermore, any number of additional software components not shown in FIG. 6 may be included within the tangible, non-transitory, computer-readable medium 600, depending on the specific application.

FIG. 7 is a block diagram of an example of a computing system that can enable a map calendar. The example system 700 includes a computing device 702. The computing device 702 includes a processing unit 704, a system memory 706, and a system bus 708. In some examples, the computing device 702 can be a gaming console, a personal computer (PC), an accessory console, a gaming controller, among other computing devices. In some examples, the computing device 702 can be a node in a cloud network.

The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure, including the memory bus or memory controller, a peripheral bus or external bus, and a local bus using any variety of available bus architectures known to those of ordinary skill in the art. The system memory 706 includes computer-readable storage media that includes volatile memory 710 and nonvolatile memory 712.

In some embodiments, a unified extensible firmware interface (UEFI) manager or a basic input/output system (BIOS), containing the basic routines to transfer information between elements within the computing device 702, such as during start-up, is stored in nonvolatile memory 712. By way of illustration, and not limitation, nonvolatile memory 712 can include read-only memory (ROM), programmable ROM (PROM), electrically programmable ROM (EPROM), electrically erasable programmable ROM (EEPROM), or flash memory.

Volatile memory 710 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computing device 702 also includes other computer-readable media, such as removable/non-removable, volatile/non-volatile computer storage media. FIG. 7 shows, for example a disk storage 714. In embodiments, the disk storage 714 may include a calendar content database that is to store at least one item of calendar content. Disk storage 714 includes, but is not limited to, devices like a magnetic disk drive, floppy disk drive, tape drive, Jaz drive, Zip drive, LS-210 drive, flash memory card, or memory stick.

In addition, disk storage 714 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 714 to the system bus 708, a removable or non-removable interface is typically used such as interface 716.

It is to be appreciated that FIG. 7 describes software that acts as an intermediary between users and the basic computer resources described in the system 700. Such software includes an operating system 718. Operating system 718, which can be stored on disk storage 714, acts to control and allocate resources of the computing device 702.

System applications 720 take advantage of the management of resources by operating system 718 through program modules 722 and program data 724 stored either in system memory 706 or on disk storage 714. It is to be appreciated that the disclosed subject matter can be implemented with various operating systems or combinations of operating systems.

A user enters commands or information into the computing device 702 through input devices 726. Input devices 726 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 726 connect to the processing unit 704 through the system bus 708 via interface ports 728. Interface ports 728 include, for example, a serial port, a parallel port, a game port, and a universal serial bus (USB).

Output devices 730 use some of the same type of ports as input devices 726. Thus, for example, a USB port may be used to provide input to the computing device 702 and to output information from computing device 702 to an output device 730.

Output adapter 732 is provided to illustrate that there are some output devices 730 like monitors, speakers, and printers, among other output devices 730, which are accessible via adapters. The output adapters 732 include, by way of illustration and not limitation, video and sound cards that provide a means of connection between the output device 730 and the system bus 708. It can be noted that other devices and systems of devices provide both input and output capabilities such as remote computing devices 734.

The computing device 702 can be a server hosting various software applications in a networked environment using logical connections to one or more remote computers, such as remote computing devices 734. The remote computing devices 734 may be client systems configured with web browsers, PC applications, mobile phone applications, and the like. The remote computing devices 734 can be a personal computer, a server, a router, a network PC, a workstation, a microprocessor based appliance, a mobile phone, a peer device or other common network node and the like, and typically includes many or all of the elements described relative to the computing device 702.

Remote computing devices 734 can be logically connected to the computing device 702 through a network interface 736 and then connected via a communication connection 738, which may be wireless. Network interface 736 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 738 refers to the hardware/software employed to connect the network interface 736 to the system bus 708. While communication connection 738 is shown for illustrative clarity inside computing device 702, it can also be external to the computing device 702. The hardware/software for connection to the network interface 736 may include, for exemplary purposes, internal and external technologies such as, mobile phone switches, modems including regular telephone grade modems, cable modems and DSL modems, ISDN adapters, and Ethernet cards.

The computing device 702 can further include a radio 740. For example, the radio 740 can be a wireless local area network radio that may operate one or more wireless bands. For example, the radio 740 can operate on the industrial, scientific, and medical (ISM) radio band at 2.4 GHz or 5 GHz. In some examples, the radio 740 can operate on any suitable radio band at any radio frequency.

The computing device 702 includes one or more program modules 722, such as a zoom level manager 742, a summarization level manager 744, and a render manager 746. In some embodiments, the zoom level manager 742 is configured to determine a zoom level of the map calendar based on input from a user. Absent input from a user, a zoom level of the map calendar may be according to user preferences. The summarization level manager 744 may be configured to determine a summarization level of the calendar content based on the zoom level. As discussed above the calendar content may be summarized semantically, intelligently, or any combination thereof. A render manager 746 may be configured to render the calendar content to the summarization level. In this manner, calendar content may be rendered at an electronic device based on a particular set of rules associated with the summarization level.

It is to be understood that the block diagram of FIG. 7 is not intended to indicate that the computing system 700 is to include all of the components shown in FIG. 7. Rather, the computing system 700 can include fewer or additional components not illustrated in FIG. 7 (e.g., additional applications, additional modules, additional memory devices, additional network interfaces, etc.). Furthermore, any of the functionalities of the zoom level manager 742, a summarization level manager 744, and a render manager 746 may be partially, or entirely, implemented in hardware and/or in the processing unit (also referred to herein as a processor) 704. For example, the functionality may be implemented with an application specific integrated circuit, in logic implemented in the processing unit 704, or in any other device.

EXAMPLES

Example 1 is a system for a map calendar. The system includes a calendar content database that is to store at least one item of calendar content; a navigation system, wherein the navigation system determines a zoom level and a panning position of the map calendar; a processor that is to: determine a summarization level based on the zoom level and the panning position of the map calendar; and render the calendar content according to the summarization level.

Example 2 includes the system of example 1, including or excluding optional features. In this example, the calendar content is a parent event with at least one child event, and in response to a manipulation of the map calendar a determination is made to render the parent event or the child event.

Example 3 includes the system of any one of examples 1 to 2, including or excluding optional features. In this example, the calendar content is a plurality of events, and in response to a manipulation of the map calendar at least one event of the plurality of events is rendered according to a relationship between the plurality of events.

Example 4 includes the system of any one of examples 1 to 3, including or excluding optional features. In this example, the calendar content is a plurality of events, and in response to a manipulation of the map calendar the plurality of events is rendered according by rafting the plurality of events.

Example 5 includes the system of any one of examples 1 to 4, including or excluding optional features. In this example, the calendar content is a plurality of events, and in response to a manipulation of the map calendar at least one event of the plurality of events is rendered according to semantic summarization between the plurality of events.

Example 6 includes the system of any one of examples 1 to 5, including or excluding optional features. In this example, the calendar content comprises any one of photographs, audio, video, animations, social networking blurbs, links such as links to other applications, web-browsing history, reminders, documents, or combination thereof.

Example 7 includes the system of any one of examples 1 to 6, including or excluding optional features. In this example, the calendar content is hidden or revealed during manipulation of the map content based on additional factors such as users associated with an event, a time of day, amount of associated content, or any combination thereof.

Example 8 is a method for a digital map calendar user interface. The method includes storing at least one item of calendar content; determining a zoom level and a panning position of the map calendar; determining a summarization level based on the zoom level and the panning position of the map calendar; and rendering the calendar content according to the summarization level.

Example 9 includes the method of example 8, including or excluding optional features. In this example, the calendar content is a parent event with at least one child event, and in response to a manipulation of the map calendar a determination is made to render the parent event or the child event.

Example 10 includes the method of any one of examples 8 to 9, including or excluding optional features. In this example, the calendar content is a plurality of events, and in response to a manipulation of the map calendar at least one event of the plurality of events is rendered according to a relationship between the plurality of events.

Example 11 includes the method of any one of examples 8 to 10, including or excluding optional features. In this example, the calendar content is a plurality of events, and in response to a manipulation of the map calendar the plurality of events is rendered according by rafting the plurality of events.

Example 12 includes the method of any one of examples 8 to 11, including or excluding optional features. In this example, the calendar content is a plurality of events, and in response to a manipulation of the map calendar at least one event of the plurality of events is rendered according to semantic summarization between the plurality of events.

Example 13 includes the method of any one of examples 8 to 12, including or excluding optional features. In this example, the calendar content comprises any one of photographs, audio, video, animations, social networking blurbs, links such as links to other applications, web-browsing history, reminders, documents, or any combination thereof.

Example 14 includes the method of any one of examples 8 to 13, including or excluding optional features. In this example, the calendar content is hidden or revealed during manipulation of the map content based on additional factors such as users associated with an event, a time of day, amount of associated content, or any combination thereof.

Example 15 is an electronic device. The electronic device includes a calendar content database that is to store at least one item of calendar content; a navigation system, wherein the navigation system determines a zoom level and a panning position of a map calendar; a processor that is to: determine a summarization level based on the zoom level and the panning position of the map calendar; and render the calendar content according to the summarization level.

Example 16 includes the electronic device of example 15, including or excluding optional features. In this example, the calendar content is a parent event with at least one child event, and in response to a manipulation of the map calendar a determination is made to render the parent event or the child event.

Example 17 includes the electronic device of any one of examples 15 to 16, including or excluding optional features. In this example, the calendar content is a plurality of events, and in response to a manipulation of the map calendar at least one event of the plurality of events is rendered according to a relationship between the plurality of events.

Example 18 includes the electronic device of any one of examples 15 to 17, including or excluding optional features. In this example, the calendar content is a plurality of events, and in response to a manipulation of the map calendar the plurality of events is rendered according by rafting the plurality of events.

Example 19 includes the electronic device of any one of examples 15 to 18, including or excluding optional features. In this example, the calendar content is a plurality of events, and in response to a manipulation of the map calendar at least one event of the plurality of events is rendered according to semantic summarization between the plurality of events.

Example 20 includes the electronic device of any one of examples 15 to 19, including or excluding optional features. In this example, the calendar content comprises photographs, audio, video, animations, social networking blurbs, links such as links to other applications, web-browsing history, reminders, documents, or any combination thereof.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for a map calendar, comprising:
 a calendar content database that is to store calendar content items, wherein the calendar content items are organized using a map calendar comprising a continuous, manipulatable sequence of data organized as units of time within a coordinate plane, and wherein the coordinate plane comprises a first axis that represents time and a second axis that represents partitions of the calendar content items according to a calendar content type;
a navigation system, wherein the navigation system determines a zoom level and a panning position of the map calendar as a manipulation of the map calendar enables real time shifting and conversion of the units of time within the coordinate plane, wherein the zoom level and the panning position encompass the units of time corresponding to at least one calendar content item;
a processor that is to:
 determine a summarization level of the at least one calendar content item based on the zoom level and the panning position of the map calendar, as well as a relationship between the at least one calendar content item and of at least one other calendar content item, wherein determining the summarization level comprises semantically and intelligently summarizing the at least one calendar content item according to a set of rules for determining a position and a compression of the at least one calendar content item along the second axis of the coordinate plane; and
 render the at least one calendar content item within the map calendar according to the summarization level.

2. The system of claim 1, wherein the at least one calendar content item is a parent event with at least one child event, and in response to the manipulation of the map calendar, a determination is made to render the parent event or the child event.

3. The system of claim 1, wherein the at least one calendar content item is an event, and in response to the manipulation of the map calendar, the event is rendered according to a relationship with a second event.

4. The system of claim 1, wherein the at least one calendar content item is an event of a plurality of events, and in response to the manipulation of the map calendar, the plurality of events is rendered by rafting the plurality of events.

5. The system of claim 1, wherein the at least one calendar content item is an event of a plurality of events, and in response to the manipulation of the map calendar, the event is rendered according to a semantic summarization of the plurality of events.

6. The system of claim 1, wherein the at least one calendar content item comprises a photograph, audio, video, an animation, a social networking blurb, a link such as a link to another application, web-browsing history, a reminder, a document, or any combination thereof.

7. The system of claim 1, wherein the at least one calendar content item is hidden or revealed during the manipulation of the map calendar based on a user associated with an event, a time of day, an amount of associated content, or any combination thereof.

8. A method for a digital map calendar user interface, comprising:
 storing, via a computing device, calendar content items, wherein the calendar content items are organized using a map calendar comprising a continuous, manipulatable sequence of data organized as units of time within a coordinate plane, and wherein the coordinate plane comprises a first axis that represents time and a second axis that represents partitions of the calendar content items according to a calendar content type;
 determining a zoom level and a panning position of the map calendar as a manipulation of the map calendar enables real time shifting and conversion of the units of time within the coordinate plane, wherein the zoom level and the panning position encompass the units of time corresponding to at least one calendar content item;
 determining a summarization level of the at least one calendar content item based on the zoom level and the panning position of the map calendar, as well as a relationship between the at least one of calendar content item and at least one other calendar content item, wherein determining the summarization level comprises semantically and intelligently summarizing the at least one calendar content item according to a set of rules for determining a position and a compression of the at least one calendar content item along the second axis of the coordinate plane; and
 rendering the at least one calendar content item within the map calendar according to the summarization level.

9. The method of claim 8, wherein the at least one calendar content item is a parent event with at least one child event, and in response to a manipulation of the map calendar a determination is made to render the parent event or the child event.

10. The method of claim 8, wherein the at least one calendar content item and the at least one other calendar content item comprise a plurality of events, and in response to the manipulation of the map calendar, at least one event of the plurality of events is rendered according to a relationship between the plurality of events.

11. The method of claim 8, wherein the at least one calendar content item and the at least one other calendar content item comprise a plurality of events, and in response to the manipulation of the map calendar, the plurality of events is rendered by rafting the plurality of events.

12. The method of claim 8, wherein the at least one calendar content item and the at least one other calendar content item comprise a plurality of events, and in response to the manipulation of the map calendar, at least one event of the plurality of events is rendered according to a semantic summarization of the plurality of events.

13. The method of claim 8, wherein the at least one calendar content item comprises a photograph, audio, video, an animation, a social networking blurb, a link such as a link to another application, web-browsing history, a reminder, a document, or any combination thereof.

14. The method of claim 8, comprising hiding or revealing the at least one calendar content item during the manipulation of the map calendar based on a user associated with an event, a time of day, an amount of associated content, or any combination thereof.

15. An electronic device, comprising:
 a calendar content database that is to store calendar content items, wherein the calendar content items are organized using a map calendar comprising a continuous, manipulatable sequence of data organized as units of time within a coordinate plane, and wherein the coordinate plane comprises a first axis that represents time and a second axis that represents partitions of the calendar content items according to a calendar content type;
 a navigation system, wherein the navigation system determines a zoom level and a panning position of the map calendar as a manipulation of the map calendar enables real time shifting and conversion of the units of time within the coordinate plane, wherein the zoom level and the panning position encompass the units of time corresponding to at least one calendar content item;

a processor that is to:
  determine a summarization level of the at least one calendar content item based on the zoom level and the panning position of the map calendar, as well as a relationship between the at least one calendar content item and of at least one other calendar content item, wherein determining the summarization level comprises semantically and intelligently summarizing the at least one calendar content item according to a set of rules for determining a position and a compression of the at least one calendar content item along the second axis of the coordinate plane; and
  render the at least one calendar content item within the map calendar according to the summarization level.

16. The electronic device of claim 15, wherein the at least one calendar content item is a parent event with at least one child event, and in response to the manipulation of the map calendar a determination is made to render the parent event or the child event.

17. The electronic device of claim 15, wherein the at least one calendar content item and the at least one other calendar content item comprise an event of a plurality of events, and in response to the manipulation of the map calendar, the event of the plurality of events is rendered according to a relationship between the plurality of events.

18. The electronic device of claim 15, wherein the at least one calendar content item and the at least one other calendar content item comprise a plurality of events, and in response to the manipulation of the map calendar, the plurality of events is rendered by rafting the plurality of events.

19. The electronic device of claim 15, wherein the at least one calendar content item and the at least one other calendar content item comprise a plurality of events, and in response to the manipulation of the map calendar, at least one event of the plurality of events is rendered according to semantic a summarization of the plurality of events.

20. The electronic device of claim 15, wherein the at least one calendar content item comprises a photograph, audio, video, an animation, a social networking blurb, a link such as a link to another application, web-browsing history, a reminder, a document, or any combination thereof.

* * * * *